US00RE45138E

(19) United States
(12) Reissued Patent
Chun et al.

(10) Patent Number: US RE45,138 E
(45) Date of Reissued Patent: *Sep. 16, 2014

(54) METHOD OF ALLOCATING RADIO RESOURCES IN A WIRELESS COMMUNICATION SYSTEM

(71) Applicant: LG Electronics Inc., Seoul (KR)

(72) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: This patent is subject to a terminal disclaimer.

(21) Appl. No.: 14/053,513

(22) Filed: Oct. 14, 2013

Related U.S. Patent Documents

Reissue of:

(64) Patent No.: 7,996,029
Issued: Aug. 9, 2011
Appl. No.: 12/667,380
PCT Filed: Aug. 22, 2008
PCT No.: PCT/KR2008/004915
§ 371 (c)(1),
(2), (4) Date: Apr. 20, 2010
PCT Pub. No.: WO2009/025525
PCT Pub. Date: Feb. 26, 2009

U.S. Applications:

(63) Continuation of application No. 13/850,979, filed on Mar. 26, 2013, now Pat. No. Re. 44,767, which is a (Continued)

(30) Foreign Application Priority Data

Aug. 22, 2008 (KR) ..... 10-2008-0082245

(51) Int. Cl.
*H04W 72/00* (2009.01)
*H04W 72/04* (2009.01)

(52) U.S. Cl.
CPC ..... *H04W 72/04* (2013.01)
USPC ..... 455/509; 455/451; 455/452.1; 455/453; 455/454; 455/455; 455/450; 370/395.4; 370/431; 370/436

(58) Field of Classification Search
USPC ..... 455/450–455
See application file for complete search history.

(56) References Cited

U.S. PATENT DOCUMENTS 7,996,029 B2 8/2011 Chun et al.
8,223,706 B2 * 7/2012 Chun et al. ..... 370/329

(Continued)

FOREIGN PATENT DOCUMENTS

CN 1921683 2/2007
GB 2434281 7/2007

(Continued)

OTHER PUBLICATIONS

Chase, "Code Combining—A Maximum-Likelihood Decoding Approach for Combining an Arbitrary Number of Noisy Packets," IEEE Transactions on Communications, vol. COM-33, No. 5, May 1985, pp. 385-393.

(Continued)

*Primary Examiner* — Fayyaz Alam

(74) *Attorney, Agent, or Firm* — Lee, Hong, Degerman, Kang & Waimey

(57) ABSTRACT

A method of allocating radio resources in a wireless communication system is disclosed. A method of allocating radio resources from a network of a wireless communication system in accordance with a plurality of scheduling modes comprises transmitting first scheduling information to a user equipment to allocate radio resources to the user equipment in accordance with a first scheduling mode, the first scheduling information including a first user equipment identifier, and transmitting second scheduling information to the user equipment to allocate radio resources to the user equipment in accordance with a second scheduling mode, the second scheduling information including a second user equipment identifier.

18 Claims, 7 Drawing Sheets

Related U.S. Application Data continuation of application No. 13/371,329, filed on Feb. 10, 2012, now Pat. No. Re. 44,203, which is an application for the reissue of Pat. No. 7,996,029.

(60) Provisional application No. 60/957,450, filed on Aug. 22, 2007, provisional application No. 60/976,766, filed on Oct. 1, 2007, provisional application No. 60/977,366, filed on Oct. 3, 2007, provisional application No. 61/018,884, filed on Jan. 3, 2008, provisional application No. 61/038,470, filed on Mar. 21, 2008, provisional application No. 61/039,095, filed on Mar. 24, 2008, provisional application No. 61/074,998, filed on Jun. 23, 2008.

(56) References Cited

U.S. PATENT DOCUMENTS

| | | | | |
|---|---|---|---|---|
| 8,315,658 | B2 * | 11/2012 | Chun et al. | 455/509 |
| RE44,203 | E * | 5/2013 | Chun et al. | 455/509 |
| RE44,767 | E * | 2/2014 | Chun et al. | 455/509 |
| 2002/0154617 | A1 | 10/2002 | Hirano et al. | |
| 2005/0220116 | A1 | 10/2005 | Ahn et al. | |
| 2006/0205413 | A1 | 9/2006 | Teague | |
| 2008/0232284 | A1 * | 9/2008 | Dalsgaard et al. | 370/310 |
| 2008/0305819 | A1 | 12/2008 | Chun et al. | |
| 2009/0245194 | A1 | 10/2009 | Damnjanovic et al. | |
| 2010/0035621 | A1 * | 2/2010 | Chun et al. | 455/450 |
| 2011/0256879 | A1 | 10/2011 | Chun et al. | |

FOREIGN PATENT DOCUMENTS

| | | |
|---|---|---|
| JP | 2010532962 | 10/2010 |
| KR | 10-2006-0052437 | 5/2006 |
| KR | 10-2007-0061329 | 6/2007 |
| KR | 10-2007-0076374 | 7/2007 |
| KR | 10-2007-0076375 | 7/2007 |
| KR | 10-2009-0016412 | 2/2009 |
| WO | 2004102431 | 11/2004 |
| WO | 2007/078173 | 7/2007 |

OTHER PUBLICATIONS

Ericsson, "MAC Stage 3 Text Proposal for Semi Persistent DL Scheduling," R2-072702, TSG-RAN WG2 Meeting #58bis, Jun. 2007, XP-050135489, 4 pages.

Nokia et al., "Stage 3 Aspects of Semi-Persistent Scheduling," R2-073059, 3GPP TSG-RAN WG2 Meeting #59, Aug. 2007, XP-050135796, 4 pages.

LG Electronics Inc., "Discussion on Persistent Scheduling," R2-073510, 3GPP TSG-RAN WG2 #59, Aug. 2007, XP-050136211, 4 pages.

NTT DoCoMo Inc., "Issues Regarding RRC_Connected DRX Operation," R2-073566, 3GPP TSG RAN WG2 #59, Aug. 2007, XP-050136257, 4 pages.

Nokia et al., "Stage 3 Aspects of Semi-Persistent Scheduling", R2-072401, 3GPP TSG-RAN WG2 Meeting #58bis, Jun. 2007, 4 pages.

Philips et al., "Control of E-UTRAN UL Scheduling", R2-073394, 3GPP TSG-RAN WG2#59, Aug. 2007, 4 pages.

Philips et al., "Control signalling for dynamically- and persistently-scheduled transmissions in E-UTRA", R1-073135, 3GPP TSG RAN WG1 Meeting #49bis, Jun. 2007, 3 pages.

* cited by examiner

METHOD OF ALLOCATING RADIO RESOURCES IN A WIRELESS COMMUNICATION SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This application is a [371 U.S. national stage application] *continuation reissue application of U.S. Reissue application Ser. No. 13/850,979, filed on Mar. 26, 2013, now U.S. Pat. No. Re. 44,767, which is a continuation reissue application of U.S. Reissue application Ser. No. 13/371,329, filed on Feb. 10, 2012, now U.S. Pat. No. Re. 44,203, which is a reissue application of U.S. Pat. No. 7,996,029 B2, issued from U.S. patent application Ser. No. 12/667,380 filed on Apr. 20, 2010, which is the National Stage filing under 35 U.S.C. 371* of international application *No.* PCT/KR2008/004915, filed on Aug. 22, 2008, which claims [priority to] *the benefit of* U.S. provisional [applications] *application Nos.* 60/957,450, filed on Aug. 22, 2007, 60/976,766, filed on Oct. 1, 2007, 60/977,366, filed on Oct. 3, 2007, 61/018,884, filed on Jan. 3, 2008, 61/038,470, filed on Mar. 21, 2008, 61/039,095, filed on Mar. 24, 2008, and 61/074,998, filed on Jun. 23, 2008, and *also claims the benefit of earlier filing date and right of priority to* Korean patent application *No.* 10-2008-0082245, filed on Aug. 22, 2008, the contents of which are *all* hereby incorporated by reference herein in their entirety.

TECHNICAL FIELD

The present invention relates to a wireless communication system, and more particularly, to a method of allocating radio resources in a wireless communication system.

BACKGROUND ART

In a wireless communication system which uses multiple carriers, such as an orthogonal frequency division multiple access (OFDMA) or a single carrier-frequency division multiple access (SC-FDMA), radio resources are a set of continuous sub-carriers and are defined by a time-frequency region on a two-dimensional sphere. A time-frequency region is a rectangular form sectioned by time and sub-carrier coordinates. In other words, one time-frequency region could be a rectangular form sectioned by at least one symbol on a time axis and a plurality of sub-carriers on a frequency axis. Such a time-frequency region can be allocated to an uplink for a specific user equipment (UE), or an eNode B can transmit the time-frequency region to a specific user equipment in a downlink. In order to define such a time-frequency region on the two-dimensional sphere, the number of OFDM symbols and the number of continuous sub-carriers starting from a point having an offset from a reference point should be given.

An evolved universal mobile telecommunications system (E-UMTS) which is currently being discussed uses 10 ms radio frame comprising 10 sub-frames. Namely, one sub-frame includes two continuous slots. One slot has a length of 0.5 ms. Also, one sub-frame comprises a plurality of OFDM symbols, and a part (for example, first symbol) of the plurality of OFDM symbols can be used for transmission of L1/L2 control information.

FIG. 1 illustrates an example of a structure of physical channels used in the E-UMTS. In FIG. 1, one sub-frame comprises an L1/L2 control information transmission region (hatching part) and a data transmission region (non-hatching part).

FIG. 2 illustrates a general method of transmitting data in the E-UMTS. In the E-UMTS, a hybrid auto repeat request (HARQ) scheme, which is one of data retransmission schemes, is used to improve throughput, thereby enabling desirable communication.

Referring to FIG. 2, the eNB transmits downlink scheduling information (hereinafter, referred to as 'DL scheduling information') through DL L1/L2 control channel, for example, a physical downlink control channel (PDCCH), to transmit data to a user equipment in accordance with the HARQ scheme. The DL scheduling information includes user equipment identifier (UE ID) or group identifier (group ID) of user equipments, location and duration (resource assignment and duration of assignment) information of radio resources allocated for transmission of downlink data, modulation mode, payload size, transmission parameters such as MIMO related information, HARQ process information, redundancy version, and new data indicator.

In order to notify that DL scheduling information is transmitted through the PDCCH for what user equipment, the user equipment identifier (or group identifier), for example, a radio network temporary identifier (RNTI) is transmitted. The RNTI can be classified into a dedicated RNTI and a common RNTI. The dedicated RNTI is used for data transmission and reception to and from a user equipment of which information is registered with a eNB. The common RNTI is used if communication is performed with user equipments, which are not allocated with dedicated RNTI as their information is not registered with the eNB. Alternatively, the common RNTI is used for transmission and reception of information used commonly for a plurality of user equipments, such as system information. For example, examples of the common RNTI include RA-RNTI and T-C-RNTI, which are used during a random access procedure through a random access channel (RACH). The user equipment identifier or group identifier can be transmitted in a type of CRC masking in DL scheduling information transmitted through the PDCCH.

User equipments located in a specific cell monitor the PDCCH through the L1/L2 control channel using their RNTI information, and receive DL scheduling information through the corresponding PDCCH if they successfully perform CRC decoding through their RNTI. The user equipments receive downlink data transmitted thereto through a physical downlink shared channel (PDSCH) indicated by the received DL scheduling information.

A scheduling mode can be classified into a dynamic scheduling mode and a persistent or semi-persistent scheduling mode. The dynamic scheduling mode is to transmit scheduling information to a specific user equipment through the PDCCH whenever allocation of uplink or downlink resources is required for the specific user equipment. The persistent scheduling mode means that the eNB allocates downlink or uplink scheduling information to the user equipment statically during initial call establishment such as establishment of a radio bearer.

In case of the persistent scheduling mode, the user equipment transmits or receives data using scheduling information previously allocated to the eNB without using DL scheduling information or UL scheduling information allocated from the eNB. For example, if the eNB previously sets a specific user equipment to allow the user equipment to receive downlink data through RRC signal and a radio resource "A" in accordance with a transport format "B" and a period "C" during establishment of a radio bearer, the user equipment can receive downlink data transmitted from the eNB using information "A", "B" and "C". Likewise, even in case that the user equipment transmits data to the eNB, the user equipment can transmit uplink data using a previously defined radio resource in accordance with previously allocated uplink scheduling information. The persistent scheduling mode is a scheduling mode that can well be applied to a service of which traffic is regular, such as voice communication.

AMR codec used in voice communication, i.e., voice data generated through voice codec has a special feature. Namely, voice data are classified into a talk spurt and a silent period. The talk spurt means a voice data period generated while a person is actually talking, and the silent period means a voice data period generated while a person does not talk. For example, voice packets, which include voice data in the talk spurt, are generated per 20 ms, and silent packets (SID), which include voice data in the silent period, are generated per 160 ms.

If the persistent scheduling mode is used for voice communication, the eNB will establish radio resources in accordance with the talk spurt. Namely, the eNB will previously establish radio resources for transmitting and receiving uplink or downlink data to and from the user equipment at an interval of 20 ms during call establishment using a feature that voice packets are generated per 20 ms. The user equipment receives downlink data or transmits uplink data using radio resources, which are previously established per 20 ms.

DISCLOSURE OF THE INVENTION

In the wireless communication system, communication can be performed in such a manner that the dynamic scheduling mode and the persistent scheduling mode are simultaneously applied to one user equipment. For example, if voice communication according to a VoIP service is performed in accordance with an HARQ scheme, the persistent scheduling mode is applied to initial transmission packets, and the dynamic scheduling mode is applied to retransmission packets. Also, if the user equipment simultaneously uses two or more services, the persistent scheduling mode can be applied to one service and the dynamic scheduling mode can be applied to the other service. In these cases, it is required that the user equipment should definitely identify whether scheduling information transmitted thereto depends on what scheduling mode, or whether the scheduling information is for initial transmission packets or retransmission packets, or whether the scheduling information is for what service.

Accordingly, the present invention is directed to a method of allocating radio resources in a wireless communication system, which substantially obviates one or more problems due to limitations and disadvantages of the related art.

An object of the present invention is to provide a method of allocating radio resources in a wireless communication system, in which radio resources can efficiently be used in the wireless communication system.

Another object of the present invention is to provide a method of allocating radio resources in a wireless communication system, in which a user equipment can definitely identify scheduling information according to each scheduling mode in a wireless communication system which allocates radio resources in accordance with a plurality of scheduling modes.

In one aspect of the present invention, a network of a wireless communication system transmits first scheduling information to a user equipment to allocate radio resources to the user equipment in accordance with a first scheduling mode, the first scheduling information including a first user equipment identifier, and transmits second scheduling information to the user equipment to allocate radio resources to the user equipment in accordance with a second scheduling mode, the second scheduling information including a second user equipment identifier.

In another aspect of the present invention, when a user equipment receives scheduling information including a user equipment identifier from a network, the user equipment transmits uplink data or receives downlink data using radio resources allocated in accordance with a first scheduling mode. When a second user equipment identifier is included in the scheduling information, the user equipment transmits uplink data or receives downlink data using radio resources allocated in accordance with a second scheduling mode.

According to the present invention, the wireless communication system can efficiently use radio resources. Also, in the wireless communication system which allocates radio resources in accordance with a plurality of scheduling modes, a user equipment can definitely identify scheduling information according to each scheduling mode.

BRIEF DESCRIPTION OF THE DRAWINGS

FIG. 5A and FIG. 5B are diagrams illustrating a structure of a radio interface protocol between a user equipment (UE) and E-UTRAN, in which FIG. 5A is a schematic view of a control plane protocol and FIG. 5B is a schematic view of a user plane protocol.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to an E-UMTS (Evolved Universal Mobile Telecommunications System).

Figure 1:
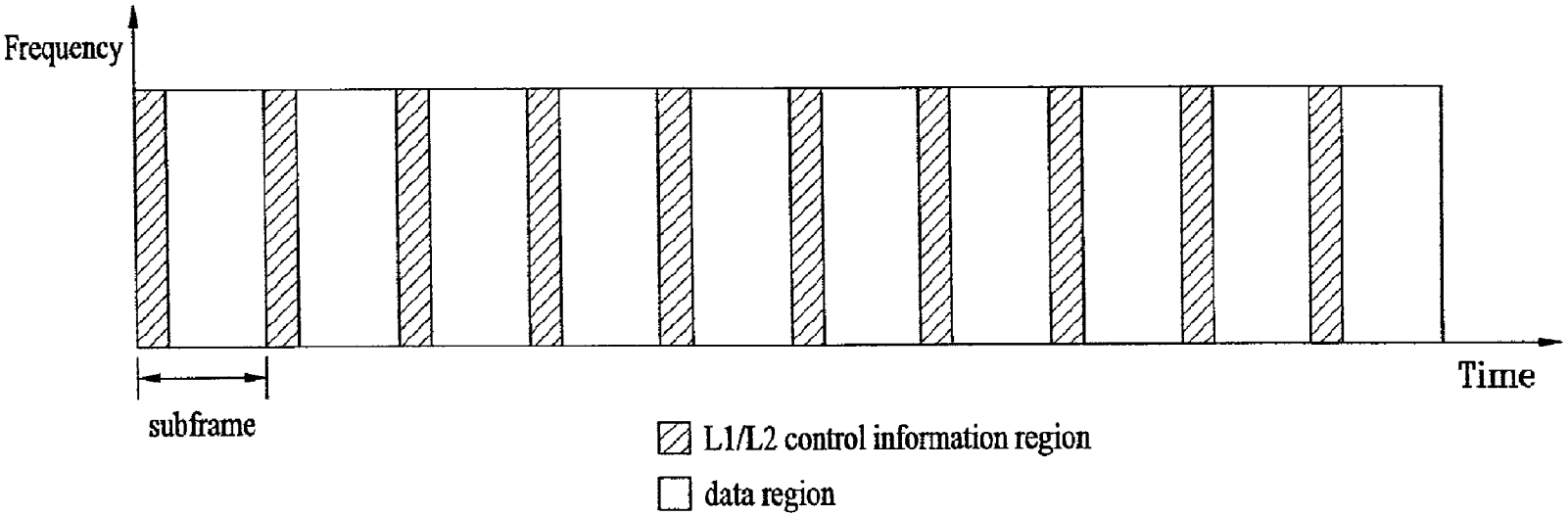
FIG. 1 is a diagram illustrating an example of a structure of a physical channel used in an E-UMTS (Evolved-Universal Mobile Telecommunications System)
Figure 2:
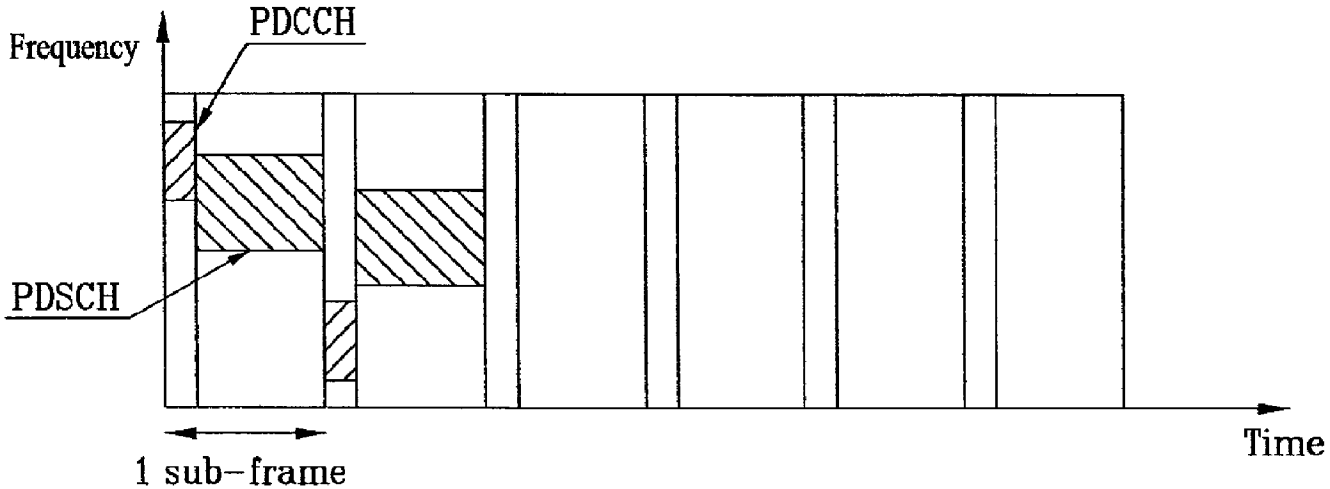
FIG. 2 is a diagram illustrating a general method of transmitting data in an E-UMTS.
Figure 3:
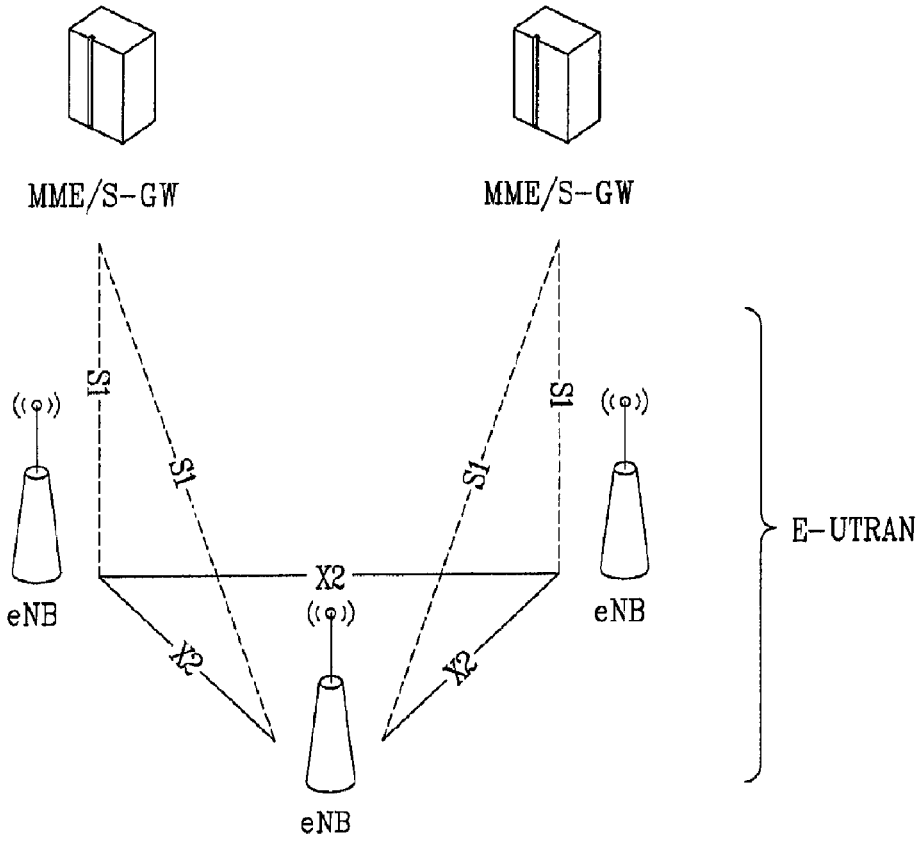
FIG. 3 is a diagram illustrating a network structure of an E-UMTS.

FIG. 3 illustrates a network structure of an E-UMTS. An E-UMTS is a system evolving from the conventional WCDMA UMTS and its basic standardization is currently handled by the 3GPP ($3^{rd}$ Generation Partnership Project). The E-UMTS can also be called an LTE (Long Term Evolution) system.

Referring to FIG. 3, an E-UTRAN includes eNode Bs (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a UE and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the UE and the network. For this, the RRC layer enables RRC messages to be exchanged between the UE and the network. The RRC layer can be distributively located at network nodes including Node B, an AG and the like or can be independently located at either the Node B or the AG.

Figure 4:
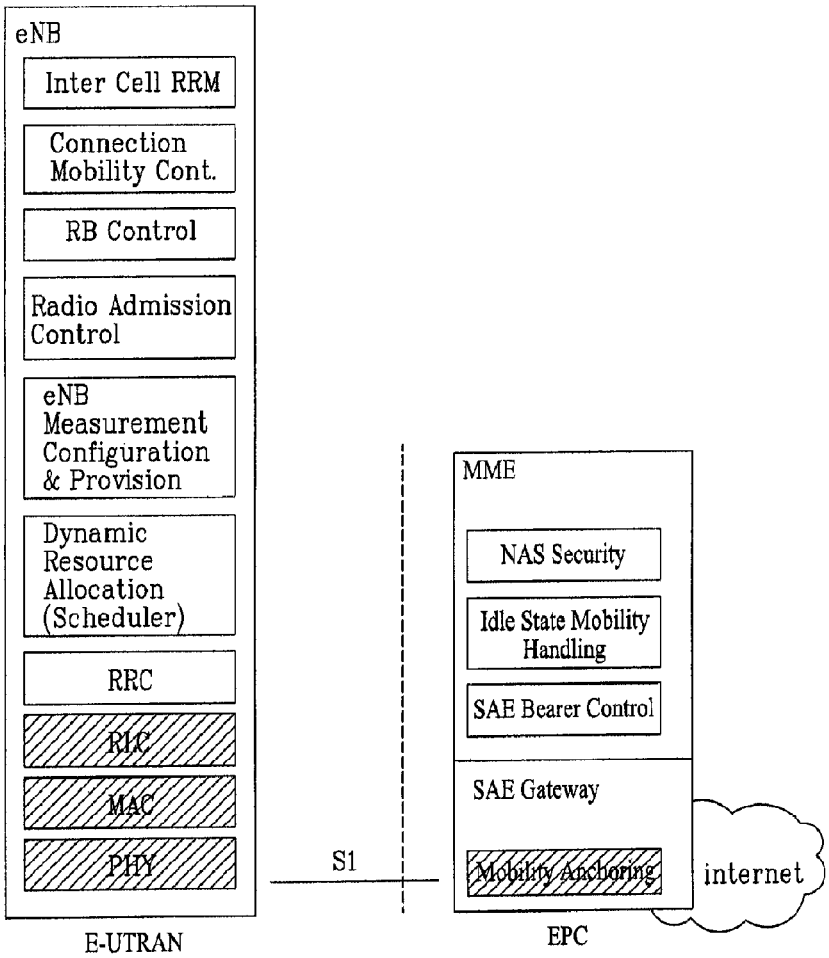
FIG. 4 is a schematic view illustrating an E-UTRAN (Evolved Universal Terrestrial Radio Access Network)

FIG. 4 is a schematic view illustrating an E-UTRAN (UMTS terrestrial radio access network). In FIG. 4, a hatching part represents functional entities of a user plane, and a non-hatching part represents functional entities of a control plane.

Figure 5A:
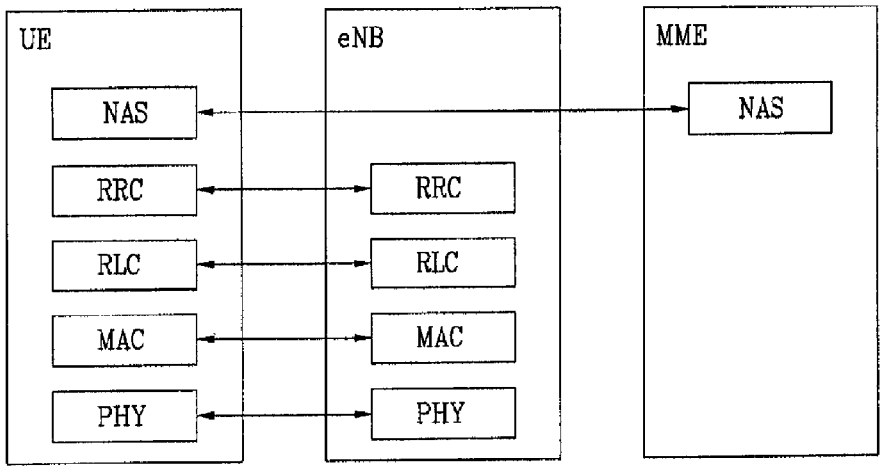
Figure 5B:
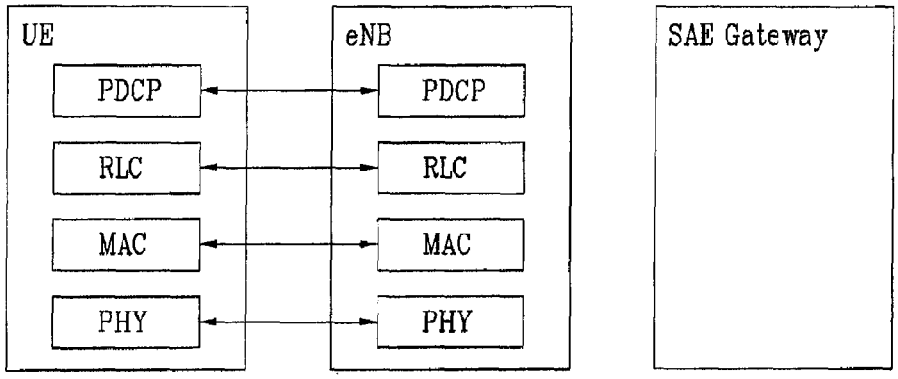

FIG. 5A and FIG. 5B illustrate a structure of a radio interface protocol between the UE and the E-UTRAN, in which FIG. 5A is a schematic view of a control plane protocol and FIG. 5B is a schematic view of a user plane protocol. Referring to FIG. 5A and FIG. 5B, a radio interface protocol horizontally includes a physical layer, a data link layer, and a network layer, and vertically includes a user plane for data information transfer and a control plane for signaling transfer. The protocol layers in FIG. 5A and FIG. 5B can be classified into L1 (first layer), L2 (second layer), and L3 (third layer) based on three lower layers of the open system interconnection (OSI) standard model widely known in the communications systems.

The physical layer as the first layer provides an information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit data using IP packets (e.g., IPv4 or IPv6) within a radio-communication period having a narrow bandwidth, a PDCP layer of the second layer (L2) performs header compression to reduce the size of unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RB s') to be in charge of controlling the logical, transport and physical channels. In this case, the RB means a service provided by the second layer for the data transfer between the UE and the UTRAN.

As downlink transport channels carrying data from the network to the UEs, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from the UEs to the network, there are provided a random access channel (RACH) carrying an initial control message and an uplink shared channel (UL-SCH) carrying user traffic or control message.

As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

In the E-UMTS system, an OFDM is used on the downlink and a single carrier frequency division multiple access (SCFDMA) on the uplink. The OFDM scheme using multiple carriers allocates resources by unit of multiple sub-carriers including a group of carriers and utilizes an orthogonal frequency division multiple access (OFDMA) as an access scheme.

Figure 6:
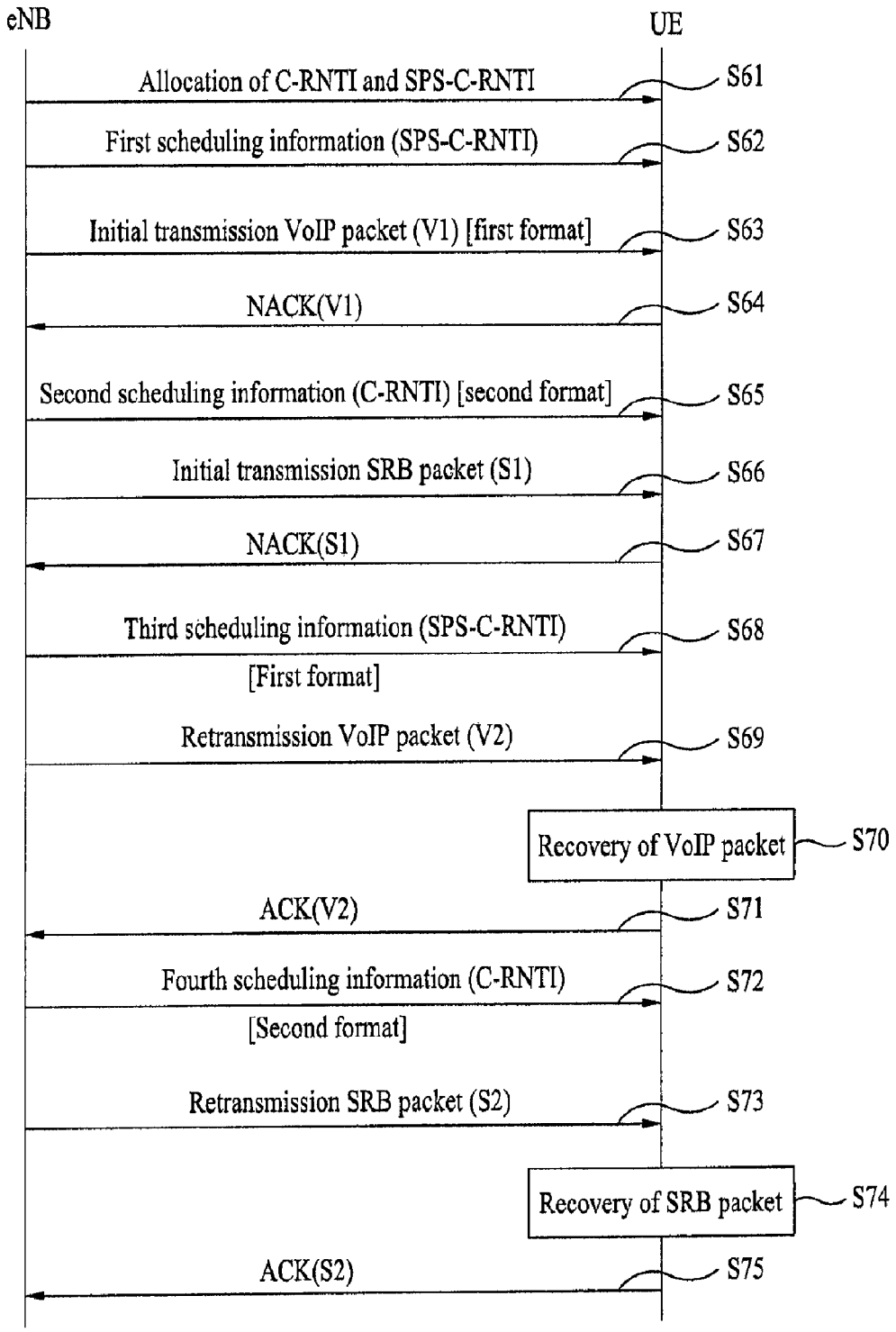
FIG. 6 is a flow chart illustrating a procedure of a method of transmitting data in accordance with one embodiment of the present invention.

FIG. 6 is a flow chart illustrating a procedure of a method of transmitting data in accordance with one embodiment of the present invention. According to the embodiment of FIG. 6, the user equipment (UE) receives SRB packets in accordance with a dynamic scheduling mode while receiving voice data (VoIP packets) in accordance with a persistent scheduling mode. Hereinafter, description will be made only if necessary for understanding of the embodiment of the present invention, and description of a general procedure required for communication between a network and a UE will be omitted.

Referring to FIG. 6, the eNode-B (eNB) allocates two UE identifiers to the UE [S61]. Examples of the two UE identifiers include a C-RNTI and an SPS-C-RNTI (Semi-Persistent Scheduling RNTI). However, the two UE identifiers will not be limited to the above examples. For example, temporary C-RNTI and RA-RNTI may be used as the two UE identifiers. The two UE identifiers can be allocated to the UE by the network during random access procedure, call establishment procedure, or radio bearer (RB) establishment procedure, etc. Also, the two UE identifiers may be allocated simultaneously or individually.

The eNB transmits first scheduling information to the UE to allocate radio resources for transmission and reception of voice data [S62]. The first scheduling information can include uplink scheduling information and downlink scheduling information. The first scheduling information includes the SPS-C-RNTI to indicate that the scheduling information is allocated in accordance with the persistent scheduling mode. The SPS-C-RNTI can be included in the first scheduling information in a type of CRC (Cyclic Redundancy Check) masking in at least part of the first scheduling information. The first scheduling information is set to have a format (first format) different from that of scheduling information according to the dynamic scheduling mode. The UE decodes the first scheduling information in accordance with the first format, and if the SPS-C-RNTI is included in the first scheduling information, the UE recognizes that the first scheduling information is scheduling information according to the persistent scheduling mode. The first scheduling information includes information associated with a location of radio resources allocated to the UE, an allocation period, and an allocation interval, etc. The UE transmits uplink data or receives downlink data using the radio resources allocated at an allocation period for an allocation interval in accordance with the first scheduling information.

The eNB transmits an initial transmission VoIP packet V1 to the UE on the PDSCH in accordance with the first scheduling information [S63]. The initial transmission VoIP packet V1 means a voice packet which is not a retransmission packet, when the HARQ scheme is used. If the UE fails to successfully receive the initial transmission VoIP packet V1, i.e., if the UE fails to decode the initial transmission VoIP packet V1, the UE transmits NACK to the eNB on a physical uplink control channel (PUCCH) [S64]. The UE receives the initial transmission VoIP packet V1 or transmits NACK (or ACK) using the first scheduling information.

When the UE receives the initial transmission VoIP packet V1 or transmits NACK (or ACK), the persistent scheduling mode is used. However, the dynamic scheduling mode is used for transmission of a retransmission VoIP packet by the eNB. Accordingly, after transmitting the NACK to the eNB, the UE should first receive scheduling information to receive the retransmission packet. To this end, the UE monitors the PDCCH of the L1/L2 control channel.

In FIG. 6, the eNB transmits second scheduling information to the UE on the PDCCH [S65]. The second scheduling information is to allocate uplink and downlink channel resources in accordance with the dynamic scheduling mode, and can include downlink (DL) scheduling information and uplink (UL) scheduling information. The second scheduling information includes the C-RNTI to indicate that the second scheduling information is allocated in accordance with the dynamic scheduling mode. The C-RNTI can be included in the second scheduling information in a type of CRC(Cyclic Redundancy Check) masking in at least part of the second scheduling information. The second scheduling information is set to have a format (second format) different from that of the scheduling information according to the persistent scheduling mode, i.e., the first scheduling information. The UE decodes the second scheduling information in accordance with the second format, and if the C-RNTI is included in the second scheduling information, the UE recognizes that the second scheduling information is scheduling information according to the dynamic scheduling mode. The second scheduling information includes a HARQ process identifier.

The eNB transmits an initial transmission SRB packet S1 to the UE in accordance with the second scheduling information [S66]. The initial transmission SRB packet S1 means SRB packet which is not a retransmission packet, when the HARQ scheme is used. If the UE fails to successfully receive the initial transmission SRB packet S1, i.e., if the UE fails to decode the initial transmission SRB packet S1, the UE transmits NACK to the eNB on the PUCCH [S67]. The UE receives the initial transmission SRB packet S1 or transmits the NACK (or ACK) using the second scheduling information.

The eNB transmits third scheduling information to the UE on PDCCH to transmit a retransmission packet V2 for the initial transmission VoIP packet V1, wherein the third scheduling information includes the SPS-C-RNTI [S68]. If the UE receives the third scheduling information which includes the SPS-C-RNTI, the UE receives the retransmission VoIP packet V2, which is transmitted from the eNB, using the third scheduling information [S69]. The UE combines the received retransmission VoIP packet V2 with the initial transmission VoIP packet V1 in accordance with the HARQ scheme to recover a VoIP packet [S70]. If the UE successfully recovers the VoIP packet, the UE transmits ACK to the eNB [S71]. The VoIP packet means a data packet intended to be transmitted from the eNB to the UE. The VoIP packet is divided into the initial transmission VoIP packet V1 and the retransmission VoIP packet V2 based on the VoIP packet and then transmitted to the UE in accordance with the HARQ scheme.

The third scheduling information can include information related to a transmission timing point when the eNB transmits the initial transmission VoIP packet V1. For example, the third scheduling information can include information indicating a transport time interval (TTI) where the initial transmission VoIP packet V1 is transmitted. The UE can easily recognize that the retransmission VoIP packet V2 is a retransmission packet for the initial transmission VoIP packet, in accordance with the information related to the timing point when the eNB transmits the initial transmission VoIP packet V1 included in the third scheduling information.

The eNB transmits fourth scheduling information to the UE on PDCCH to transmit a retransmission packet S2 for the initial transmission SRB packet S1, wherein the fourth scheduling information includes the C-RNTI [S72]. If the UE receives the fourth scheduling information which includes the C-RNTI, the UE receives the retransmission SRB packet S2, which is transmitted from the eNB, using the fourth scheduling information [S73]. The UE combines the received retransmission SRB packet S2 with the initial transmission SRB packet S1 in accordance with the HARQ scheme to recover an SRB packet [S74]. If the UE successfully recovers the SRB packet, the UE transmits ACK to the eNB [S75]. The SRB packet means a data packet intended to be transmitted from the eNB to the UE. The SRB packet is divided into the initial transmission SRB packet S1 and the retransmission SRB packet S2 based on the SRB packet and then transmitted to the UE in accordance with the HARQ scheme. The fourth scheduling information includes the same HARQ process identifier as that included in the second scheduling information.

In the embodiment of FIG. 6, the first scheduling information to the fourth scheduling information can further include identification information that can identify whether the data packet transmitted from the eNB to the UE in accordance with the first scheduling information to the fourth scheduling information is the initial transmission packet or the retransmission packet. The identification information can be included in the first scheduling information to the fourth scheduling information in such a manner that a specific field of the first scheduling information to the fourth scheduling information is set to a value which is a previously determined. For example, a first retransmission packet, a second retransmission packet, and a third retransmission packet can be identified in such a manner that specific values such as 1, 2 and 3 are set in a redundancy version (RV) field included in the first scheduling information to the fourth scheduling information. In addition to the RV field, other field included in the first scheduling information to the fourth scheduling information, for example, at least one of HARQ process ID field, format field, MCS field, NDI (New data indicator) field, TPC field, "Cyclic shift for DMRS" field, "TX antenna" field, and CQI request field is set to a specific value, whereby the set value can be used as the identification information.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between an eNB and a UE. A specific operation which has been described as being performed by the eNB may be performed by an upper node of the eNB as the case may be. In other words, it will be apparent that various operations performed for communication with the UE in the network which includes a plurality of network nodes along with the cNB may be performed by the eNB or network nodes other than the eNB. The eNB may be replaced with terms such as a fixed station, base station, Node B, eNode B, and access point. Also, the UE may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used in a wireless communication system such as a mobile communication system or a wireless Internet system.

The invention claimed is:

[1. A method of radio resources allocation at a user equipment of a wireless communication system, the method comprising:

receiving scheduling information from a network, wherein the scheduling information comprises either a radio network temporary identifier (C-RNTI) to indicate that the scheduling information is associated with a dynamic scheduling mode or a Semi-Persistent Scheduling RNTI (SPS-C-RNTI) to indicate that the scheduling information is associated with a semi-persistent scheduling mode;

if the scheduling information comprises the C-RNTI, receiving downlink data using the scheduling information during a corresponding transmission interval only; and if the scheduling information comprises the SPS-C-RNTI, receiving the downlink data using the scheduling information periodically according to an allocation period included in the scheduling information.]

[2. The method of claim 1, wherein the C-RNTI and the SPS-C-RNTI are allocated from the network before receiving the scheduling information.]

[3. The method of claim 1, wherein the scheduling information is received on a physical downlink control channel (PDCCH).]

[4. A method of radio resources allocation at a user equipment of a wireless communication system, the method comprising:

receiving scheduling information from a network, wherein the scheduling information comprises either a radio network temporary identifier (C-RNTI) to indicate that the scheduling information is associated with a dynamic scheduling mode or a Semi-Persistent Scheduling RNTI (SPS-C-RNTI) to indicate that the scheduling information is associated with a semi-persistent scheduling mode;

if the scheduling information comprises the C-RNTI, transmitting uplink data using the scheduling information during a corresponding transmission interval only; and if the scheduling information comprises the SPS-C-RNTI, transmitting the uplink data using the scheduling information periodically according to an allocation period included in the scheduling information.]

[5. The method of claim 4, wherein the C-RNTI and the SPS-C-RNTI are allocated from the network before receiving the scheduling information.]

[6. The method of claim 4, wherein the scheduling information is received on a physical downlink control channel (PDCCH).]

[7. A user equipment for use in a wireless communication system, the user equipment comprising:

a receiver configured to:

receive scheduling information from a network, wherein the scheduling information comprises either a radio network temporary identifier (C-RNTI) to indicate that the scheduling information is associated with a dynamic scheduling mode or a Semi-Persistent Scheduling RNTI (SPS-C-RNTI) to indicate that the scheduling information is associated with a semi-persistent scheduling mode;

receive downlink data using the scheduling information during a corresponding transmission interval only, if the scheduling information comprises the C-RNTI; and receive the downlink data using the scheduling information periodically according to an allocation period included in the scheduling information, if the scheduling information comprises the SPS-C-RNTI; and a transmitter configured to:

transmit uplink data using the scheduling information during a corresponding transmission interval only, if the scheduling information comprises the C-RNTI; and transmit the uplink data using the scheduling information periodically according to an allocation period included in the scheduling information, if the scheduling information comprises the SPS-C-RNTI.]

*8. A method of transmitting data by a Node B in a wireless communication system, the method comprising:*

*transmitting either a first user equipment (UE) identifier for a persistent scheduling mode or a second UE identifier for a dynamic scheduling mode to a UE on a control channel;*

*transmitting a first data packet to the UE in accordance with the persistent scheduling mode if the first UE identifier has been transmitted to the UE on the control channel; and*

*transmitting a second data packet to the UE in accordance with the dynamic scheduling mode if the second UE identifier has been transmitted to the UE on the control channel.*

*9. The method of claim 8, wherein the first UE identifier and the second UE identifier are allocated to the UE by the Node B.*

*10. The method of claim 8, wherein the control channel is a physical downlink control channel (PDCCH).*

*11. The method of claim 8, wherein the first UE identifier is a Semi-Persistent Scheduling RNTI (SPS-C-RNTI) and the second UE identifier is a radio network temporary identifier (C-RNTI).*

*12. The method of claim 8, further comprising transmitting scheduling information for transmitting a retransmission packet of the first data packet to the UE, the scheduling information comprising information which indicates a transmit time interval (TTI) when the first data packet was transmitted.*

*13. The method of claim 8, further comprising transmitting scheduling information for transmitting a retransmission packet of the second data packet to the UE, the scheduling information comprising a hybrid auto repeat request (HARQ) process ID which is identical to an HARQ process ID of the second data packet.*

*14. A method of receiving data by a Node B in a wireless communication system, the method comprising:*

*transmitting either a first user equipment (UE) identifier for a persistent scheduling mode or a second UE identifier for a dynamic scheduling mode to a UE on a control channel;*

*receiving a first data packet from the UE in accordance with the persistent scheduling mode if the first UE identifier has been transmitted to the UE on the control channel; and*

*receiving a second data packet from the UE in accordance with the dynamic scheduling mode if the second UE identifier has been transmitted to the UE on the control channel.*

*15. The method of claim 14, wherein the first UE identifier and the second UE identifier are allocated by the Node B.*

*16. The method of claim 14, wherein the control channel is a physical downlink control channel (PDCCH).*

*17. The method of claim 14, wherein the first UE identifier is a Semi-Persistent Scheduling RNTI (SPS-C-RNTI) and the second UE identifier is a radio network temporary identifier (C-RNTI).*

*18. The method of claim 14, further comprising transmitting scheduling information for transmitting a retransmission packet of the first data packet to the UE, the scheduling information comprising information which indicates a transmit time interval (TTI) when the first data packet was transmitted.*

*19. The method of claim 14, further comprising transmitting scheduling information for transmitting a retransmission packet of the second data packet to the UE, the scheduling information comprising a hybrid auto repeat request (HARQ) process ID which is identical to an HARQ process ID of the second data packet.*

*20. A Node B for transmitting data in a wireless communication system, the Node B configured to:*

*transmit either a first user equipment (UE) identifier for a persistent scheduling mode or a second UE identifier for a dynamic scheduling mode to a UE on a control channel;*

*transmit a first data packet to the UE in accordance with the persistent scheduling mode if the first UE identifier has been transmitted to the UE on the control channel; and*

*transmit a second data packet to the UE in accordance with the dynamic scheduling mode if the second UE identifier has been transmitted to the UE on the control channel.*

*21. The Node B of claim 20, wherein the control channel is a physical downlink control channel (PDCCH).*

*22. The Node B of claim 20, wherein the first UE identifier is a Semi-Persistent Scheduling RNTI (SPS-C-RNTI) and the second UE identifier is a radio network temporary identifier (C-RNTI).*

*23. A Node B for receiving data in a wireless communication system, the Node B configured to:*

*transmit either a first user equipment (UE) identifier for a persistent scheduling mode or a second UE identifier for a dynamic scheduling mode to a UE on a control channel;*

*receive a first data packet from the UE in accordance with the persistent scheduling mode if the first UE identifier has been transmitted to the UE on the control channel; and*

*receive a second data packet from the UE in accordance with the dynamic scheduling mode if the second UE identifier has been transmitted to the UE on the control channel.*

*24. The Node B of claim 23, wherein the control channel is a physical downlink control channel (PDCCH).*

*25. The Node B of claim 23, wherein the first UE identifier is a Semi-Persistent Scheduling RNTI (SPS-C-RNTI) and the second UE identifier is a radio network temporary identifier (C-RNTI).*

* * * * *